3,331,873
REMOVAL OF CHLORINE FROM LIQUID
PHOSGENE WITH ACTIVATED CARBON
Richard C. De Long, Snyder, Charles R. Wagner, Hamburg, and Bertram J. Samuels, Tonawanda, N.Y., assignors to Allied Chemical Corporation, New York, N.Y., a corporation of New York
No Drawing. Filed Apr. 23, 1965, Ser. No. 450,519
4 Claims. (Cl. 260—544)

This invention relates to a novel process for the treatment of phosgene and more particularly relates to a process for the removal of relatively small quantities of chlorine from phosgene and especially to such a process which includes also a step of recovering the chlorine in the form of phosgene.

Phosgene is a valuable raw material used in the synthesis of many important organic chemicals, such as dyestuffs, pharmaceuticals, polycarbonates and isocyanates. As is well known, phosgene is manufactured by passing a gaseous mixture of carbon monoxide and chlorine over a suitable catalyst, such as activated carbon. The reaction is practically quantitative although relatively small amounts of either carbon monoxide or chlorine or both are generally present in the phosgene. These contaminants can be substantially completely removed by washing with organic solvents, by passing the crude phosgene over metallic antimony or through mercury, or by condensation of the phosgene and venting the residual gas stream to the air. These and similar procedures produce a purified phosgene which though satisfactory for most industrial applications nevertheless may contain small but measurable quantities of chlorine.

This amount may and usually does fluctuate due to variation of the metering controls which are part of the phosgene generation equipment. This malfunction can result in a chlorine content of the phosgene stream far in excess of the normal. For example, a phosgene generator producing streams containing from 50 to 100 p.p.m. (parts per million) of chlorine may suddenly produce a stream of phosgene containing 2000 p.p.m. or more. Such abnormal amounts of chlorine are not only wasteful but also are objectionable in many reactions, since this significant quantity of chlorine may result in side reactions, which may affect the physical and chemical properties of the product. For example, by-products, such as chlorinated isocyanates may be formed and remain as contaminants in many isocyanates. Inferior properties of urethane polymers produced from such contaminated isocyanates have been attributed to halogen-containing impurities.

It is, therefore a principal object of this invention to provide an effective process for the purification of phosgene.

Another object is to devise a process for the removal of small quantities of chlorine from phosgene.

A still further object is to devise a process for the removal of chlorine from phosgene which includes a step of recovering the chlorine as phosgene.

Other objects will be obvious from the following description of the present invention.

We have discovered that liquid mixtures comprising phosgene and relatively minor amounts of chlorine can be freed of essentially all the chlorine by intimately contacting said liquid mixture with activated carbon. The phosgene emanating from the activated carbon contains less than 25 p.p.m. of chlorine. The carbon, we have found, can adsorb substantial amounts of chlorine, e.g. up to about 16% of its weight of chlorine at about $-5\pm2°$ C., i.e. the carbon will continue to remove chlorine from the phosgene stream until it contains about 16% by weight of chlorine. Thereafter, the carbon can be reactivated by heating it above about 70° C., preferably to within about 150° and 250° C., while passing a stream of carbon monoxide, preferably at a flow rate of between about 25 to 750 lbs. per sq. foot of active carbon bed cross section, until the gas stream emanating from the carbon bed is substantially free of phosgene, i.e., it contains less than 0.05% by volume of phosgene.

The stream of carbon monoxide containing phosgene which emanates from the active carbon bed can be directed to the phosgene generator which upon admixture with chlorine and passage over the catalyst is converted to phosgene.

The economic benefits of such a process are evident. Not only is the main stream highly pure phosgene, i.e., it contains less than 25 p.p.m. of chlorine, but the chlorine which is removed from the phosgene is recovered as phosgene from the activated carbon. The carbon monoxide used to regenerate the carbon bed can be reused to prepare phosgene by directing the carbon monoxide containing phosgene derived from the adsorbed chlorine into the phosgene generator along with fresh chlorine. In commercial operations involving multi-tonnage quantities of phosgene, the benefits derived, not only by providing purified phosgene, but by recovering and reusing (as phosgene) significant quantities of chlorine, are substantial.

The activated carbon material used in the process of our invention can be selected from a broad class of these well-known materials which are commercially available. These agents, which depend, in part, upon the large ratio of their surface area to their mass are available in forms of varying degree of porosity of the individual particles. Both mineral and vegetable derived carbons are suitable. An activated carbon having a relatively fine pore size, e.g., in the approximate area of 20 Angstrom units, has been found to be particularly effective and hence is to be preferred. A typical activated carbon having a relatively fine pore size or structure is available under the trade designation Type BPL Carbon, a mineral derived carbon. Type PCB Carbon, a vegetable derived carbon is likewise highly effective. Activated carbons having somewhat larger pore structures but suitable for use in this process are available commercially under the trade designations of Type CAL and Type SGL Carbon.

Any device that provides good liquid-solid contact can be used to carry out the process of the present invention. A packed tower or column conventionally used to separate components of mixtures with activated carbon is preferred. Other devices or apparatus such as vigorously agitated vessels, enclosed filter beds and the like can be used. Preferably, means for both heating and cooling the carbon are provided. The process can be operated in either a batch-wise fashion or continuously, the latter manner being preferred.

In accordance with a preferred manner of carrying out the process of the invention, liquid phosgene containing a significant quantity of chlorine, i.e. 25 to 2000 p.p.m., or more, is passed into an absorption tower packed with activated carbon and surrounded by heat exchange means, through which cooling brine continuously circulates. The crude phosgene enters the column cooled to and maintained at a temperature below 8° C. and preferably at 0 to −10° C. at the bottom thereof and flows through the activated carbon bed. The purified phosgene exits from the column at a point at or near the top thereof. The liquid phosgene passes through an automatic chlorine detector which measures the chlorine content of the phosgene. When the chlorine content increases to 25 p.p.m. or more, the crude phosgene stream is interrupted, or more preferably diverted to a second absorption tower wherein the purification of the liquid phosgene is effected in an identical manner. The tower containing the spent charcoal bed is drained of liquid phosgene. The cooling water is also drained from the heat exchanger, and replaced with steam or other heating agent. The spent charcoal bed is heated to a temperature of at least 70° C. and thereafter carbon monoxide is passed into the tower and through the charcoal at a flow rate in the range of 25 to 750 lbs. per hour per square foot of charcoal bed cross-section. Preferably, the temperature is increased to about 150° C. as the flow rate is adjusted to about 500 lbs./sq. ft. charcoal bed cross-section. The gas stream emanating from the top of the column is monitored to indicate phosgene content. When the phosgene content of the gas stream falls to 0.05% by volume of phosgene or less, the regeneration step is considered completed and the column is again ready for use to purify phosgene.

As indicated, the liquid phosgene is maintained at a temperature below 8° C., the boiling point of phosgene under normal conditions and preferably at a temperature within the range of 0° to −10° C. The flow of the liquid phosgene through the activated carbon bed can be by gravity or the liquid may be pumped. The rate of flow should, of course, be such as to permit sufficient contact with and residence time in the carbon bed to permit substantial removal of the chlorine i.e. less than 25 p.p.m. chlorine. The height of the carbon bed also should be such that, together with the rate of flow and time of contact, substantially complete removal of the chlorine (less than 25 p.p.m.) is effected. These non-critical parameters can be determined and adjusted readily by those of ordinary skill in this art.

The following examples will illustrate the process of our invention.

Example 1

A two foot long Liebig condenser was charged with 26 grams of Type BPL activated carbon. Isopropyl alcohol, cooled to 0° C., was pumped through the cooling jacket of the condenser. About 230 grams of phosgene containing 340 p.p.m. of chlorine were run through the column, in about 20 minutes, from top to bottom. The effluent phosgene contained no detectable chlorine.

(Chlorine was determined by measuring the U.V. absorption of a 5% by weight solution of the phosgene in reagent carbon tetrachloride in the range of 3500–3100 Angstroms.)

Example 2

Regeneration of the spent carbon was demonstrated by the following experiment.

A 75 gram portion of Type PCB activated carbon was stirred at −50° C. with 500 ml. of phosgene containing 30 grams of chlorine dissolved therein. The phosgene was drained from the "spent" carbon which was freed of excess phosgene by gentle warming. The carbon was charged to a 11 inch length of ¾ inch I.D. (inside diameter) glass tubing the outside surface of which was wrapped with electrical resistance wire for supplying heat to the column and contents. Carbon monoxide was fed, at the rate of 0.58 gram per minute, to the bottom of the packed column and vented from the top of the column into a gas liquid chromatograph which analyzed the vent gases for phosgene at regular intervals. The data obtained are listed in the Table I below.

TABLE I

| Time (minutes) | Column Temp.,[1] ° C. | Phosgene in Exit Gas, percent |
|---|---|---|
| 0 | 19 | ([2]) |
| 5 | 16.5 | 28.1 |
| 22 | 125 | 37.1 |
| 30 | 151 | ([2]) |
| 37 | ([2]) | 12.04 |
| 52 | 153.5 | 4.88 |
| 67 | 154.4 | 2.24 |
| 82 | 146.0 | 1.21 |
| 97 | 148.0 | 0.78 |
| 112 | ([2]) | 0.47 |
| 127 | 150 | 0.27 |
| 142 | ([2]) | 0.16 |
| 157 | ([2]) | 0.057 |

[1] Determined by thermocouple. Hot end placed at 6 inch depth in carbon.
[2] Not determined.

Example 3

The procedure of Example 2 above was repeated with the following variations:

(a) The flow rate of carbon monoxide was maintained at 2.3 grams/minute through the carbon column.

(b) The carbon column was maintained at about 200° C.

The data obtained in this run is shown in Table II below.

TABLE II

| Time (minutes) | Column Temp., ° C. | Phosgene in Exit Gas, percent |
|---|---|---|
| 0 | +3.5 | 13.2 |
| 2 | −2.0 | 8.6 |
| 5 | +14 | 28.2 |
| 8 | 49 | 35.4 |
| 11 | 103.5 | 30.8 |
| 16 | 176 | 12.3 |
| 22 | 216.5 | 0.6 |
| 26 | 197 | 0.1 |
| 36 | 195 | 0.05 |
| 46 | 197 | Negligible |

Example 4

Liquid phosgene containing 300 to 400 p.p.m. of chlorine was introduced into a 10 ft. x 1.2 ft. I.D. jacketed carbon absorption tower containing 830 pounds activated carbon. The phosgene flowed at the rate of 6500 lbs./hr. through the carbon bed which was maintained at about −5° C. by means of brine circulating through coils in the jacket. Phosgene containing less than about 25 p.p.m. of chlorine was removed from the top of the column. After 48 hours, the chlorine content of the purified phosgene increased to above 25 p.p.m. The phosgene stream was then diverted to a similar standby jacketed tower wherein the purification operation was continued.

The phosgene remaining in the first column was permitted to drain out of the column and from the spent carbon bed. The cooling medium was replaced with steam. Carbon monoxide at the rate of 500 lbs./hr. was passed through the carbon bed as the temperature thereof was gradually increased to and maintained at about 150° C. The gas stream exiting from the top of the column was monitored for phosgene and was piped to the phosgene generator unit. After 2 hours, the phosgene content of the exit gas was less than 0.05% by volume. The gas stream was shut off and the regenerated carbon bed was permitted to cool in an atmosphere of carbon monoxide. The column was then ready for use in the purification of phosgene.

It can thus be seen that an efficient and practical procedure for purification of phosgene containing contaminating amounts of elemental chlorine has been devised. Further a remarkably efficient means for recovering and re-using the chlorine removed from the phosgene has also been devised which when combined with the purification step results in a unitary process having highly desirable economic benefits.

Our invention has been described by several illustrative examples which include the best mode presently known to us for practicing this invention. It should be distinctly understood, however, that these purely illustrative examples are not to be interpreted in a limiting sense and that many variations in the details contained therein will be obvious to those skilled in this art. Such variations, since they do not involve a departure from the scope or spirit of our invention, are to be included therein.

We claim:

1. A process for treatment of phosgene containing chlorine in excess of 25 p.p.m. and recovery and conversion of said chlorine into additional phosgene which comprises passing phosgene containing more than 25 p.p.m. of chlorine in intimate contact with activated carbon, maintaining said phosgene in the liquid phase while in contact with said activated carbon, separating phosgene containing less than 25 p.p.m. of chlorine from said activated carbon, thereafter recovering the chlorine removed from the liquid phosgene and contained in the activated carbon by maintaining the activated carbon at a temperature above about 70° C., passing carbon monoxide gas in contact with said activated carbon to effect removal of chlorine contained in said activated carbon and concomitant conversion of said chlorine to phosgene and recovery of gaseous mixture of carbon monoxide and phosgene.

2. A process for treating phosgene containing in excess of 25 p.p.m. of chlorine to effect reduction of the chlorine in the said phosgene to less than 25 p.p.m. and to convert chlorine removed from said phosgene into additional phosgene which comprises passing a stream of phosgene containing in excess of 25 p.p.m. of chlorine through a bed of activated carbon to effect removal of chlorine from the phosgene, maintaining phosgene passing through the activated carbon bed in the liquid phase at a temperature within the range of about 8° C. to about −10° C., recovering phosgene containing less than 25 p.p.m. of chlorine after passage through the activated carbon bed, thereafter passing carbon monoxide gas through the activated carbon bed in the liquid phase at a temperature about 70° C. to effect conversion of the chlorine contained in the activated carbon to phosgene and discharge of the resultant phosgene by passage of excess carbon monoxide through the bed, and then introducing additional liquid phosgene containing in excess of 25 p.p.m. of chlorine through the bed for further removal of chlorine.

3. A process for treating phosgene containing in excess of 25 p.p.m. of chlorine which comprises contacting liquid phosgene containing in excess of 25 p.p.m. of chlorine with activated carbon, maintaining the phosgene in the liquid phase during its contact with the activated carbon, and separating liquid phosgene containing less than 25 p.p.m. of chlorine from said activated carbon.

4. A process for treating phosgene which comprises continuously passing a stream of liquid phosgene containing in excess of 25 p.p.m. of chlorine through a bed of activated carbon, recovering phosgene containing less than 25 p.p.m. of chlorine after passage through the bed of activated carbon, terminating the introduction of phosgene into the bed of activated carbon before the bed of activated carbon has adsorbed 16% by weight of chlorine, thereafter heating the bed of activated carbon to a temperature above about 70° C., passing carbon monoxide through said heated bed of actvated carbon until the gas flowing from said bed contains less than 0.05% by weight of phosgene, thereafter terminating the introduction of carbon monoxide into the bed, cooling the bed of activated carbon, and introducing liquid phosgene containing more than 25 p.p.m. of chlorine into the bed to effect further removal of chlorine from the phosgene.

References Cited

UNITED STATES PATENTS 3,230,253   1/1966   Bottenbruch et al. _____ 260—544

FOREIGN PATENTS 583,477   12/1946   Great Britain.

LORRAINE A. WEINBERGER, *Primary Examiner.*

RICHARD K. JACKSON, *Assistant Examiner.*